July 8, 1941.  A. B. MacTAGGART  2,248,370

RECTIFIER SYSTEM

Filed July 21, 1939

INVENTOR.
ARTHUR B. MacTAGGART
BY Horace B. Fay
ATTORNEY.

Patented July 8, 1941

2,248,370

UNITED STATES PATENT OFFICE 2,248,370

RECTIFIER SYSTEM

Arthur B. MacTaggart, Toledo, Ohio

Application July 21, 1939, Serial No. 285,765

2 Claims. (Cl. 175—363)

This invention relates, as indicated, to apparatus for the prevention of rusting in steel water tanks, but has reference more particularly to apparatus for use in analyzing the currents thus generated.

In Patent No. 2,176,514 issued to George J. Thomson, there is discussed the cathodic protection of steel water tanks for the prevention of rusting of such tanks, and there is disclosed apparatus consisting of a transformer and a rectifier for effecting such protection.

I have found, in connection with the cathodic protection of such tanks, that there are no constant factors which can be tabulated from basic analyses that will determine the amount of current that must be used in order to counteract the natural current generation tendency of the tank when filled with water.

Accordingly, I have found that it is necessary, when providing cathodic protection to a steel tank filled with water, to provide means for varying the current applied to the tank in order to overcome the natural tendency of the steel and water in contact with each other to generate current.

To the accomplishment of the foregoing and related ends, said invention, then, consists of the apparatus disclosed in the accompanying drawing, and which is now to be described.

In said annexed drawing—

Figure 1:
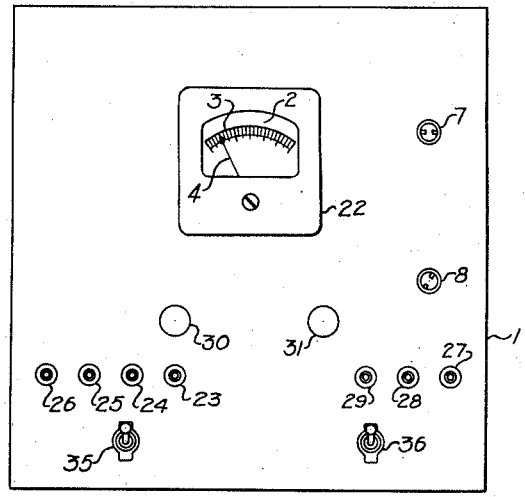
Fig. 1 is a front elevational view of a cabinet which houses the apparatus.
Figure 2:
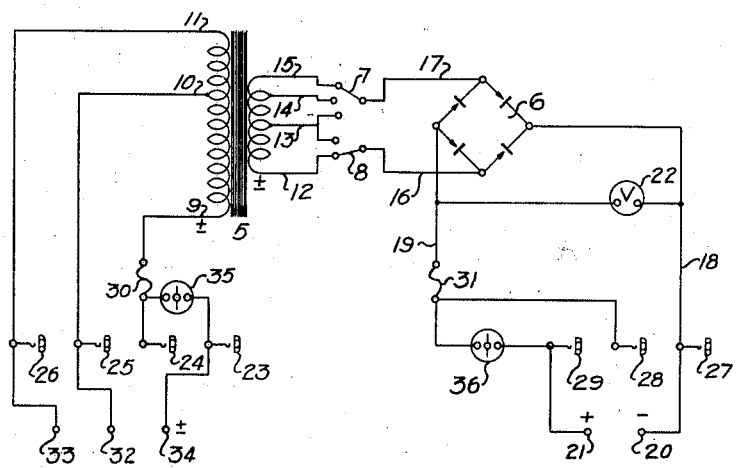
Fig. 2 is a wiring diagram of the apparatus.

Referring more particularly to the drawing, reference character 1 illustrates a metallic cabinet having a window 2 therein through which a voltmeter scale 3 and pointer 4 are visible.

Within the cabinet 1 is disposed a step-down transformer 5 and a current rectifier 6, as well as a pair of key operated switches 7 and 8, whereby the voltage supplied to the rectifier 6 may be varied within predetermined limits.

The step-down transformer, in the present instance, is provided with primary input connections 9, 10 and 11, of 0, 105 and 120 volts respectively, and secondary leads 12, 13, 14 and 15 of 0, 30, 40 and 50 volts, respectively. By means of the switches 7 and 8, voltages of 10, 20, 30, 40 or 50 volts may be supplied to the current rectifier 6 through the leads 16 and 17. The rectified current is then conducted, as by wires 18 and 19, to terminals 20 and 21, from which leads are run to the positive and negative connections on the steel water tank, which have been described in the aforesaid copending application.

A voltmeter 22, having the scale 3 and pointer 4, as depicted in Fig. 1, is installed across the wires 18 and 19, and if desired, an ammeter (not shown) may be inserted in one of the wires.

The apparatus further comprises seven jacks, four of them, designated by reference numerals 23, 24, 25 and 26, being connected to the primary circuit, and three of them, designated by reference numerals 27, 28 and 29, being connected to the secondary circuit.

Before current is applied to provide cathodic protection for a steel water tank, the secondary jacks may be used for the purpose of taking a definite reading of the tank, to determine the exact voltage which is being generated therein. Moreover, the resistance of the water, the conductivity of the water, and its current density can be determined by means of these jacks, with the aid of special instruments provided for these purposes.

After such readings have been taken for the purpose of analyzing the exact conditions to be overcome, the voltage variation switches 7 and 8, can be set to provide the proper input of direct current, and the voltmeter 22 will give a definite reading of that voltage and afford evidence of the fact that the unit is operating properly.

A fuse 30 is provided in the primary line and a fuse 31 is provided in the secondary line in order to prevent damage to the apparatus in the event of an overload of any kind.

The jacks 23, 24, 25 and 26 in the primary circuit may be utilized for the purpose of determining the amount of current consumed in providing the necessary cathodic protection, with the aid of special instruments.

As an aid in securing the aforesaid readings, the primary jacks 25 and 26 are preferably black and the primary jacks 23 and 24 are red.

The primary line (A. C.) input is read on a voltmeter to determine whether one leg of the line shall be connected to the terminal 32 (105 volts) or to the terminal 33 (120 volts). It is also determined which leg of the line is designated as the "hot" and it in turn is connected to the other primary terminal 34.

A toggle switch 35 is provided between the two red jacks 23 and 24, which enables the user of the apparatus to turn the current on or off for the purposes of research and study, with the aid of special instruments. Readings can be taken to determine the voltage by connecting a voltmeter to the proper black jack, 25 or 26, and either of the red jacks, 23 or 24, when the switch 35 is in the "on" position.

Should it be desired to determine the amperage, connections are made to the two red jacks 23 and 24, with the switch 35 in the "off" position, thereby permitting the current to flow through the ammeter on one side of the line only.

The jacks 27, 28 and 29 are utilized for the purpose of determining the exact relationship between the primary and the secondary currents, the jack 27, which is preferably black, being in the negative line 18, and the jacks 28 and 29, which are preferably red, being in the positive line 19. By means of these jacks, a voltage reading can be taken by making one connection to the black jack 27 and a second connection to either of the red jacks, 28 or 29, when a toggle switch 36, in the line 19 and between the two red jacks, is in the "on" position. In order to determine the amperage of the secondary circuit, a connection, by means of special instruments, is made to each of the red jacks 28 or 29, with the toggle switch 36 in the "off" position.

It is thus seen that I have provided a compact apparatus which is useful, not only in analyzing the currents generated in water tanks which are subject to corrosion and rusting, but also in controlling the voltages required for counteracting such currents.

It will be understood that various changes may be made in the invention with out departing from the scope of the subjoined claims, as for example, in the number of switches used for varying the voltages supplied to the rectifier, the type of rectifier employed, the arrangement of the voltmeter, fuses and toggle switches, etc., including the use of an automatic voltage control device in the place of the voltage regulating switches mentioned herein.

Other modes of applying the principle of my invention may be employed instead of the one explained, change being made as regards the form or construction herein disclosed, provided the means stated by any of the following claims or the equivalent of such stated means be employed.

I therefore particularly point out and distinctly claim as my invention:

1. In apparatus of the character described, the combination of a cabinet, a primary transformer coil therein, a wire in communication with said primary coil, a pair of jacks in communication with said wire, a switch interposed between said jacks, a fuse interposed between both of said jacks and said primary coil, a pair of wires in communication with said primary coil, a pair of jacks in communication with said pair of wires, a transformer secondary coil in said cabinet and in inductive relation with said primary coil, a plurality of leads in communication with said secondary coil, a rectifier, a pair of conductors communicating with said rectifier, switching means interposed between said conductors and said leads whereby said conductors may communicate with various of said leads, a pair of outgoing wires communicating with said rectifier, a pair of jacks communicating with one of said outgoing wires, a switch interposed between said last-named pair of jacks, a fuse interposed between said last-named switch and said rectifier, a jack in communication with the other of said outgoing wires, and a voltmeter in communication with both of said outgoing wires, all of said jacks, all of said switches, both of said fuses, and said voltmeter, being in exposed relationship relative to said cabinet whereby operations and adjustments do not require opening of said cabinet.

2. In a rectifying apparatus a transformer including primary and secondary windings, a rectifier, means operatively connecting the rectifier with one of said transformer windings, connection taps on the other transformer winding, one of said connection taps including two jacks connected in parallel with said one connection tap, and a switch connected in series with one of said jacks and said one connection tap whereby an instrument may be connected in series with said connection tap by connecting said instrument across said jacks with the switch open.

ARTHUR B. MacTAGGART.